(12) United States Patent
Kim et al.

(10) Patent No.: US 11,205,839 B2
(45) Date of Patent: Dec. 21, 2021

(54) BEAMFORMING ANTENNA ASSEMBLY INCLUDING PATTERNED MIRROR AND VEHICLE SIDE MIRROR ASSEMBLY INCLUDING THE SAME

(71) Applicant: Samsung Electronics Co., Ltd., Suwon-si (KR)

(72) Inventors: Yoongeon Kim, Suwon-si (KR); Seungtae Ko, Suwon-si (KR); Taesik Yang, Suwon-si (KR); Juneyong Young, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 463 days.

(21) Appl. No.: 15/796,103

(22) Filed: Oct. 27, 2017

(65) Prior Publication Data

US 2018/0138587 A1 May 17, 2018

Related U.S. Application Data

(60) Provisional application No. 62/420,644, filed on Nov. 11, 2016.

(30) Foreign Application Priority Data

Dec. 28, 2016 (KR) .................. 10-2016-0181468

(51) Int. Cl.
*H01Q 1/32* (2006.01)
*H01Q 15/00* (2006.01)
(Continued)

(52) U.S. Cl.
CPC ............ *H01Q 1/3266* (2013.01); *H01Q 5/30* (2015.01); *H01Q 15/0013* (2013.01);
(Continued)

(58) Field of Classification Search
None
See application file for complete search history.

(56) References Cited

U.S. PATENT DOCUMENTS

| 5,627,541 A * | 5/1997 | Haley ............... H01Q 17/00 |
| | | 342/1 |
| 10,027,397 B2 * | 7/2018 | Kim ............... H04B 7/2606 |

(Continued)

FOREIGN PATENT DOCUMENTS

| CN | 1905276 A | 1/2007 |
| CN | 205177991 U | 4/2016 |

(Continued)

OTHER PUBLICATIONS

European Search Report dated Aug. 5, 2019, issued in European Patent Application No. 17869092.1.
(Continued)

*Primary Examiner* — Trinh V Dinh
(74) *Attorney, Agent, or Firm* — Jefferson IP Law, LLP

(57) ABSTRACT

A beamforming antenna assembly is provided. The beamforming antenna assembly includes a mirror glass coated with a material, and a beamforming antenna disposed on a portion of the mirror glass. A pattern is formed on the portion of the mirror glass so that a beam radiated from the beamforming antenna passes therethrough.

7 Claims, 11 Drawing Sheets

(51) Int. Cl.

| | | |
|---|---|---|
| *H01Q 19/06* | (2006.01) | |
| *H01Q 19/10* | (2006.01) | |
| *H01Q 5/30* | (2015.01) | |
| H01Q 1/42 | (2006.01) | |
| H04B 7/06 | (2006.01) | |
| H01Q 9/04 | (2006.01) | |
| H04B 7/0426 | (2017.01) | |

(52) U.S. Cl.
CPC ........... *H01Q 19/06* (2013.01); *H01Q 19/104* (2013.01); *H01Q 1/42* (2013.01); *H01Q 9/0407* (2013.01); *H04B 7/043* (2013.01); *H04B 7/0617* (2013.01)

(56) References Cited

U.S. PATENT DOCUMENTS

| | | | | |
|---|---|---|---|---|
| 10,263,342 | B2* | 4/2019 | Hand | H01Q 1/38 |
| 10,374,316 | B2* | 8/2019 | Bennett | H01Q 1/50 |
| 2007/0024511 | A1 | 2/2007 | Li et al. | |
| 2009/0079645 | A1* | 3/2009 | Sotelo | H01Q 3/46 |
| | | | | 343/755 |
| 2010/0085272 | A1* | 4/2010 | Legay | H01Q 3/46 |
| | | | | 343/913 |
| 2010/0220036 | A1* | 9/2010 | Maruyama | H01Q 3/46 |
| | | | | 343/912 |
| 2016/0218430 | A1 | 7/2016 | Park et al. | |
| 2016/0231417 | A1 | 8/2016 | Aoki et al. | |
| 2016/0277941 | A1 | 9/2016 | Kim et al. | |
| 2016/0315378 | A1 | 10/2016 | Kiriyama et al. | |
| 2017/0346179 | A1* | 11/2017 | Wu | H01Q 9/0414 |
| 2019/0319355 | A1* | 10/2019 | Ko | H01Q 15/0006 |

FOREIGN PATENT DOCUMENTS

| | | |
|---|---|---|
| CN | 105991759 A | 10/2016 |
| CN | 106252844 A | 12/2016 |
| DE | 36 42 072 A1 | 6/1988 |
| DE | 40 03 057 A1 | 8/1991 |
| EP | 2 109 181 A1 | 10/2009 |
| JP | 5262831 B2 | 8/2013 |
| JP | 2016-127297 A | 7/2016 |
| KR | 10-2011-0078720 A | 7/2011 |
| KR | 10-2011-0126238 A | 11/2011 |

OTHER PUBLICATIONS

Chinese Office Action dated Jul. 21, 2020; Chinese Appln. No. 201780065914.8.

Hu et al.; A Smart Car for the Surface Shape Measurement of Large Antenna Based on Laser Tracker; Departmnent of Precision Machinery and Precision Instrumentation, University of Science and Technology of China, Hefei 230027; Mar. 19, 2013; China.

Chinese Office Action with English translation dated dated Mar. 10, 2021; Chinese Appln. No. 201780065914.8.

* cited by examiner

BEAMFORMING ANTENNA ASSEMBLY INCLUDING PATTERNED MIRROR AND VEHICLE SIDE MIRROR ASSEMBLY INCLUDING THE SAME

CROSS-REFERENCE TO RELATED APPLICATION(S)

This application claims the benefit under 35 U.S.C. § 119(e) of a U.S. Provisional application filed on Nov. 11, 2016 in the U.S. Patent and Trademark Office and assigned Ser. No. 62/420,644, and under 35 U.S.C. § 119(a) of a Korean patent application filed on Dec. 28, 2016 in the Korean Intellectual Property Office and assigned Ser. No. 10-2016-0181468, the entire disclosure of which is hereby incorporated by reference.

TECHNICAL FIELD

The present disclosure relates to a beamforming antenna assembly including a patterned mirror and a vehicle side mirror assembly including the beamforming antenna assembly. More particularly, the present disclosure relates to a beamforming antenna assembly that allows a beam radiated from a beamforming antenna to pass a mirror through a pattern.

BACKGROUND

To meet increasing demands for wireless data traffic after commercialization of the fourth generation (4G) communication system, efforts have been made to develop an improved fifth generation (5G) or pre-5G communication system. Therefore, the 5G or pre-5G communication system is also called a 'Beyond 4G Network' or a 'Post long term evolution (LTE) System.' The 5G communication system is considered to be implemented in higher frequency (mm-Wave) bands, e.g., 60 GHz bands, so as to accomplish higher data rates. To decrease propagation loss of the radio waves and increase the transmission distance, various techniques such as beamforming, massive multiple-input multiple-output (MIMO), full dimensional MIMO (FD-MIMO), array antenna, analog beamforming, and large scale antenna techniques are being discussed in the 5G communication system. Additionally, in the 5G communication system, development for a system network improvement is underway based on an advanced small cell, a cloud radio access network (cloud RAN), an ultra-dense network, device-to-device (D2D) communication, wireless backhaul, a moving network, cooperative communication, coordinated multi-points (CoMP), reception-end interference cancellation, and the like. Further, in the 5G system, hybrid frequency shift keying (FSK) and quadrature amplitude modulation (QAM) (e.g., Feher's QAM (FQAM)) and sliding window superposition coding (SWSC) are being developed as an advanced coding modulation (ACM) schemes, and filter bank multi carrier (FBMC), non-orthogonal multiple access (NOMA), and sparse code multiple access (SCMA) are also being developed as advanced access technologies.

Meanwhile, the Internet is evolving from a human-centric network, in which humans generate and consume information, into an Internet of things (IoT) network in which distributed things exchange and process information. Further, the IoT technology combines with big data processing technology through connection with a cloud server or the like, thus developing into an Internet of everything (IoE) technology. In order to realize the IoT, relevant technologies such as sensing technology, wired/wireless communication, network infrastructure, service interface technology, and security technology are required. Thus, recently, technologies such as a sensor network, machine-to-machine (M2M), and machine type communication (MTC) are studied. In the IoT environment, an intelligent Internet technology (IT) service can be provided that collects and analyzes data generated from connected things and thereby create new value in a human life. The IoT can be applied to fields of a smart home, a smart building, a smart city, a smart car or connected car, a smart grid, health care, a smart home appliance, and an advanced medical service through the fusion of existing IT and various industries.

Accordingly, various attempts are now made to apply the 5G communication system to the IoT network. For example, technologies such as a sensor network, M2M, and MTC are implemented by techniques such as beamforming, MIMO, and array antennas which belong to the 5G communication technology. To apply a cloud RAN for the above-mentioned big data processing technology is an example of the fusion of the 5G technology and the IoT technology.

The 5G communication technology considers the communication standard in a super-high frequency band. The super-high frequency band, namely, a frequency band of 30 GHz or more, is also referred to as a millimeter wave frequency band because the wavelength is 10 mm or less.

One of the features in the millimeter wave band is that a propagation loss according to distance becomes great because of a high frequency in comparison with a lower frequency band. However, since the wavelength also becomes shortened, the propagation loss may be overcome by applying beamforming through a high-gain analog directional antenna using multiple antennas. Thus, a beamforming design using multiple antennas is one of the critical issues in the millimeter wave band communication.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure provide a beamforming antenna assembly capable of solving at least the following problem.

If there is a mirror around an antenna used for beamforming, and if such a beamforming antenna performs scanning for finding a channel for transmission of radio wave, a problem may arise in that the radio wave is blocked by the mirror and thereby the scanning performance of the antenna is deteriorated.

In accordance with an aspect of the present disclosure a beamforming antenna assembly is provided. The beamforming antenna assembly includes a mirror glass coated with a material, and a beamforming antenna disposed on a portion of the mirror glass. A pattern may be formed on the portion of the mirror glass so that a beam radiated from the beamforming antenna passes therethrough.

In the beamforming antenna assembly, the pattern may have a shape determined based on a wavelength of the beamforming antenna.

In the beamforming antenna assembly, the pattern may be formed using a plurality of unit patterns having a rectangular shape which are spaced apart from each other at predetermined intervals in a horizontal direction and a vertical direction on the mirror glass.

The beamforming antenna assembly may further comprise a radome formed to cover the beamforming antenna.

In accordance with another aspect of the present disclosure, a vehicle side mirror assembly is provided. The vehicle side mirror assembly includes a beamforming antenna. The beamforming antenna may be disposed on a first portion of a mirror glass of the vehicle side mirror assembly and embedded in the vehicle side mirror assembly. On the first portion of the mirror glass, a pattern may be formed to pass a beam radiated from the beamforming antenna.

In the vehicle side mirror assembly, the pattern may have a shape determined based on a wavelength of the beamforming antenna.

In the vehicle side mirror assembly, the pattern may be formed using a plurality of unit patterns having a rectangular shape which are spaced apart from each other at predetermined intervals in a horizontal direction and a vertical direction on the mirror glass.

The vehicle side mirror assembly may further comprise an electronic device disposed on a second portion of the mirror glass and embedded in the vehicle side mirror assembly. On the second portion of the mirror glass, a silver plating may be formed.

In the vehicle side mirror assembly, the beamforming antenna may be disposed at an outer position from a vehicle in the vehicle side mirror assembly, and a beam radiation area of the beamforming antenna may be formed in a semicircular shape from a front to a rear of the vehicle in a vehicle outward direction.

The vehicle side mirror assembly may further comprise a radome formed to cover the beamforming antenna.

In accordance with another aspect of the present disclosure a mirror for an antenna is provided. The mirror includes a first region formed of a plurality of continuous patterns, and a second region formed of a plurality of discontinuous patterns.

The mirror is configured such that, when an electric current is supplied to the mirror for the antenna, a current flows through the continuous pattern in the first region to form an electromagnetic wave.

In accordance with another aspect of the present disclosure, a fine pattern formed on a mirror may maintain an inherent function of the mirror and also enhance the performance of a beamforming antenna by allowing a beam of the beamforming antenna to pass through the pattern. Therefore, it is possible to attach the beamforming antenna to the mirror and also utilize the mirror itself as an antenna by using the pattern.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
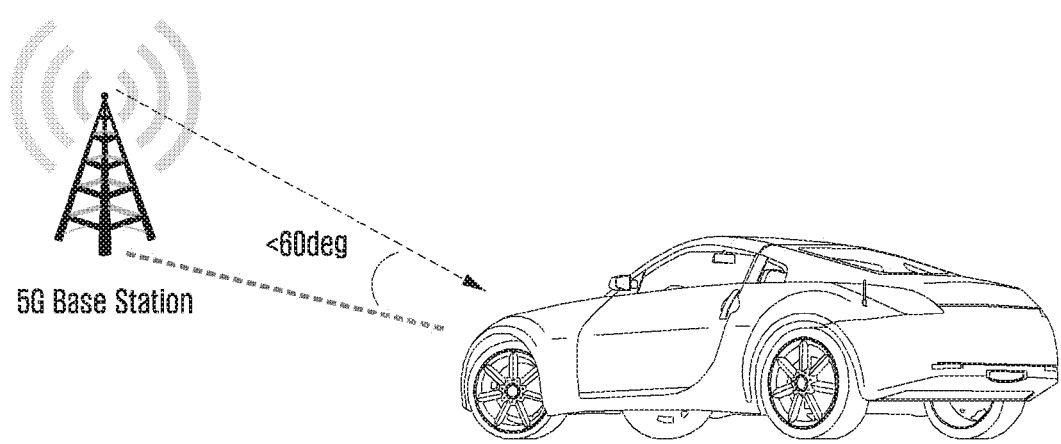
FIG. 1 is a diagram illustrating communication between a base station and a beamforming antenna mounted on a vehicle according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some elements are exaggerated, omitted or shown schematically in the accompanying drawings. Also, the size of each element does not entirely reflect the actual size. In the drawings, the same or corresponding elements are denoted by the same reference numerals.

The advantages and features of the present disclosure and the manner of achieving them will become apparent with reference to the embodiments described in detail below with reference to the accompanying drawings. The present disclosure may, however, be embodied in many different forms and should not be construed as limited to the embodiments set forth herein. Rather, these embodiments are provided so that this disclosure will be thorough and complete, to fully convey the scope of the disclosure to those skilled in the art.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit," as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented to drive one or more central processing units (CPUs) in a device or a secure multimedia card. Also, in embodiments, a unit may include one or more processors.

According to the combination of the fifth generation (5G) technology and the Internet of Things (IoT) technology as described above, a beamforming antenna used for 5G communication may be applied to various devices.

FIG. 1 is a diagram illustrating communication between a base station and a beamforming antenna mounted on a vehicle according to an embodiment of the present disclosure.

Referring to FIG. 1, in an example where the beamforming antenna is disposed on a vehicle, FIG. 1 shows communication between the vehicle and a 5G base station.

In order to allow the beamforming antenna disposed on the vehicle to communicate with the base station and thereby provide a 5G service to the vehicle, the coverage for communication between the 5G base station and the beamforming antenna should be ensured as shown in FIG. 1.

Normally, in order to provide seamless 5G communication, such a coverage needs to secure an azimuth in all directions (i.e., 360 degrees) and also secure an altitude of about −10 degrees to about 60 degrees. However, when the beamforming antenna is disposed on the vehicle, it is difficult to secure an ideal coverage due to the influence of metal constituting the vehicle.

Therefore, a space that minimizes the influence of metal is required to dispose the beamforming antenna on the vehicle. The present disclosure proposes an approach to dispose the beamforming antenna on a mirror of the vehicle so as to minimize a bad influence on the communication coverage due to metal.

Figure 2:
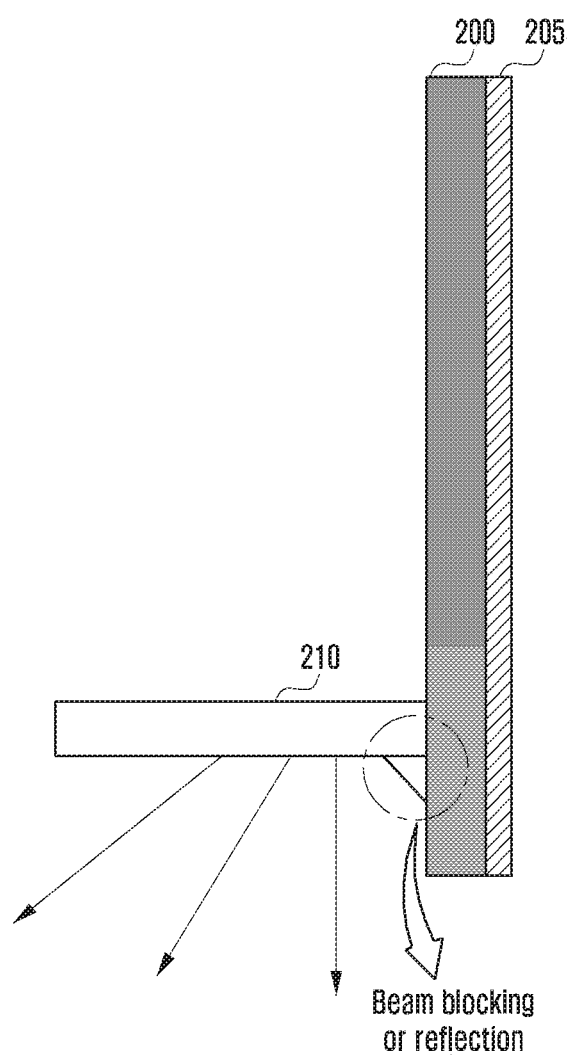
FIG. 2 is a diagram illustrating a beamforming antenna attached to a silver-plated mirror glass according to an embodiment of the present disclosure.

FIG. 2 is a diagram illustrating a beamforming antenna attached to a silver-plated mirror glass according to an embodiment of the present disclosure.

Referring to FIG. 2, when a beamforming antenna 210 radiates beams, some of the beams radiated from the beamforming antenna 210 may be blocked or reflected by a silver-plated mirror glass 200 as shown in FIG. 2.

This is because a mirror has a metallic property by a silver plating 205 formed on the silver-plated mirror glass 200, and the beam radiated from the beamforming antenna 210 cannot pass through the silver-plated mirror glass 200.

In order to solve this problem, it is necessary not to form the silver plating on the mirror glass. However, no silver plating will cause another problem of losing the function of the mirror.

Therefore, the beamforming antenna which is disposed on the mirror may have a smaller beam radiation area than that of a typical beamforming antenna having no mirror. Namely, in order to secure the same communication coverage as the typical beamforming antenna with no mirror, it is required to increase the number of beamforming antennas disposed on the mirror.

However, increasing the number of beamforming antennas is undesirable in view of efficiency and cost. Accordingly, the present disclosure has been made to solve this problem through a method of forming a pattern in the silver plating of the mirror glass.

Figure 3:
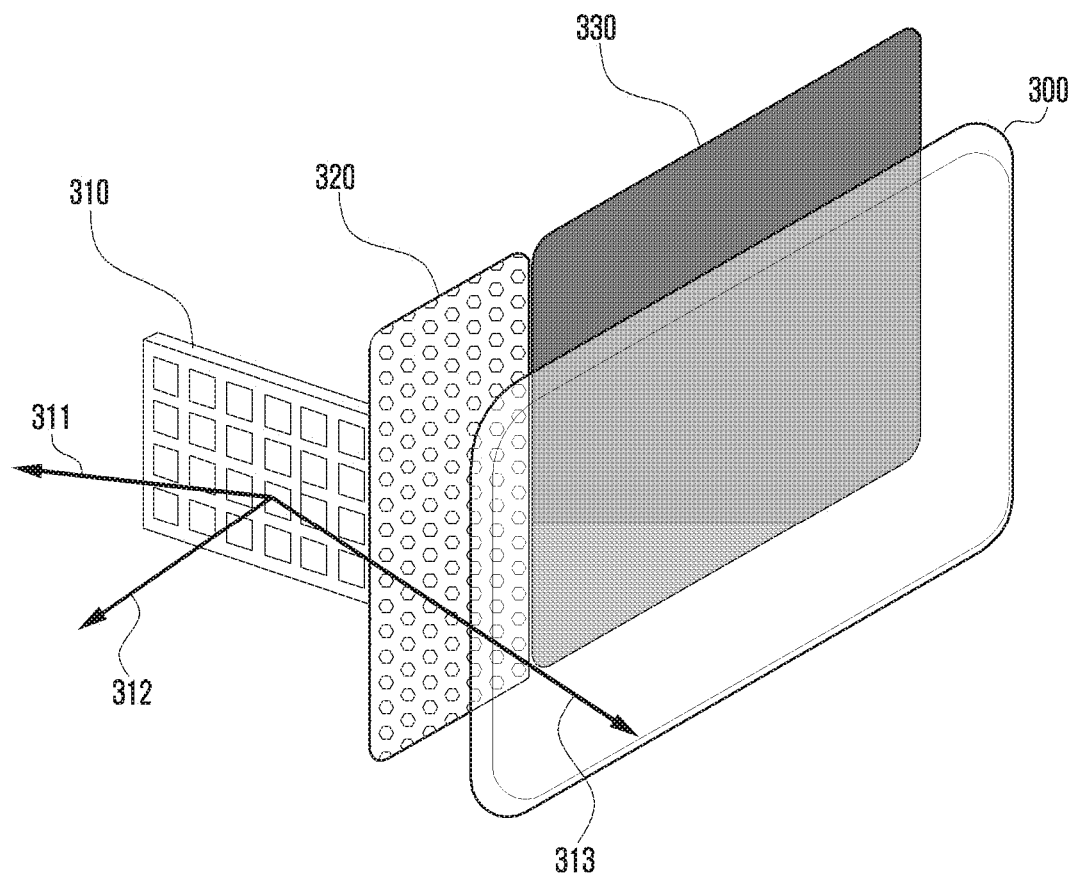
FIG. 3 is a diagram illustrating a beamforming antenna disposed on a mirror glass having a pattern according to an embodiment of the present disclosure.

FIG. 3 is a diagram illustrating a beamforming antenna disposed on a mirror glass having a pattern according to an embodiment of the present disclosure.

Referring to FIG. 3, an embodiment of the present disclosure provides a beamforming antenna assembly that includes a mirror glass 300 coated with a material and a beamforming antenna 310 disposed on a portion of the mirror glass 300. In particular, a pattern is formed on the portion of the mirror glass 300 so that a beam radiated from the beamforming antenna 310 passes therethrough.

The material coated on the mirror glass 300 may include metal such as silver, which is most frequently used in a mirror.

Namely, a normal silver plating 330 is formed on a portion of the mirror glass 300 where the beamforming antenna 310 is not disposed. In addition, a patterned silver plating 320 is formed on the other portion of the mirror glass 300 at which a beam radiated from the beamforming antenna 310 arrives. The patterned silver plating 320 allows the arriving beam to pass through the pattern.

In this disclosure, a pattern means a specific shape and is a term commonly used in semiconductor fabrication processes. A process of forming the pattern is referred to as patterning. The pattern may be engraved or embossed on a surface.

In semiconductor fabrication processes, a pattern may be utilized to apply a designed circuit to a semiconductor substrate, and may also be utilized to minimize heat generated during semiconductor fabrication processes.

Today, such a pattern is utilized in various fields in addition to semiconductor fabrication processes. In the present disclosure, the pattern is applied to the mirror so as to pass beams of the beamforming antenna while maintaining the function of the mirror.

As illustrated in FIG. 3, it is assumed that the beamforming antenna 310 radiates beams in three directions 311, 312, and 313, for example. Among them, the first and second directional beams sent in directions 311 and 312, respectively, propagate outward without colliding with the mirror, so that they can be used for communication with the base station.

On the other hand, the third directional beam 313 is radiated toward the mirror. In this case, if the mirror is a typical silver-plated mirror, the third directional beam 313 will not pass through the mirror and instead scatter. However, according to the present disclosure, the third directional beam 313 will propagate outward without scattering through the pattern because the pattern is formed in the patterned silver plating 320 on a portion of the mirror.

Assuming that the pattern does not deteriorate the performance of the beamforming antenna, a potential problem is whether the patterned mirror can perform an inherent function of the mirror.

If the mirror loses its function due to the pattern formed thereon, the meaning of the present disclosure may be faded. Therefore, it is needed to design a suitable shape and size of the pattern. A detailed description will be given hereinafter with reference to FIG. 4.

Figure 4:
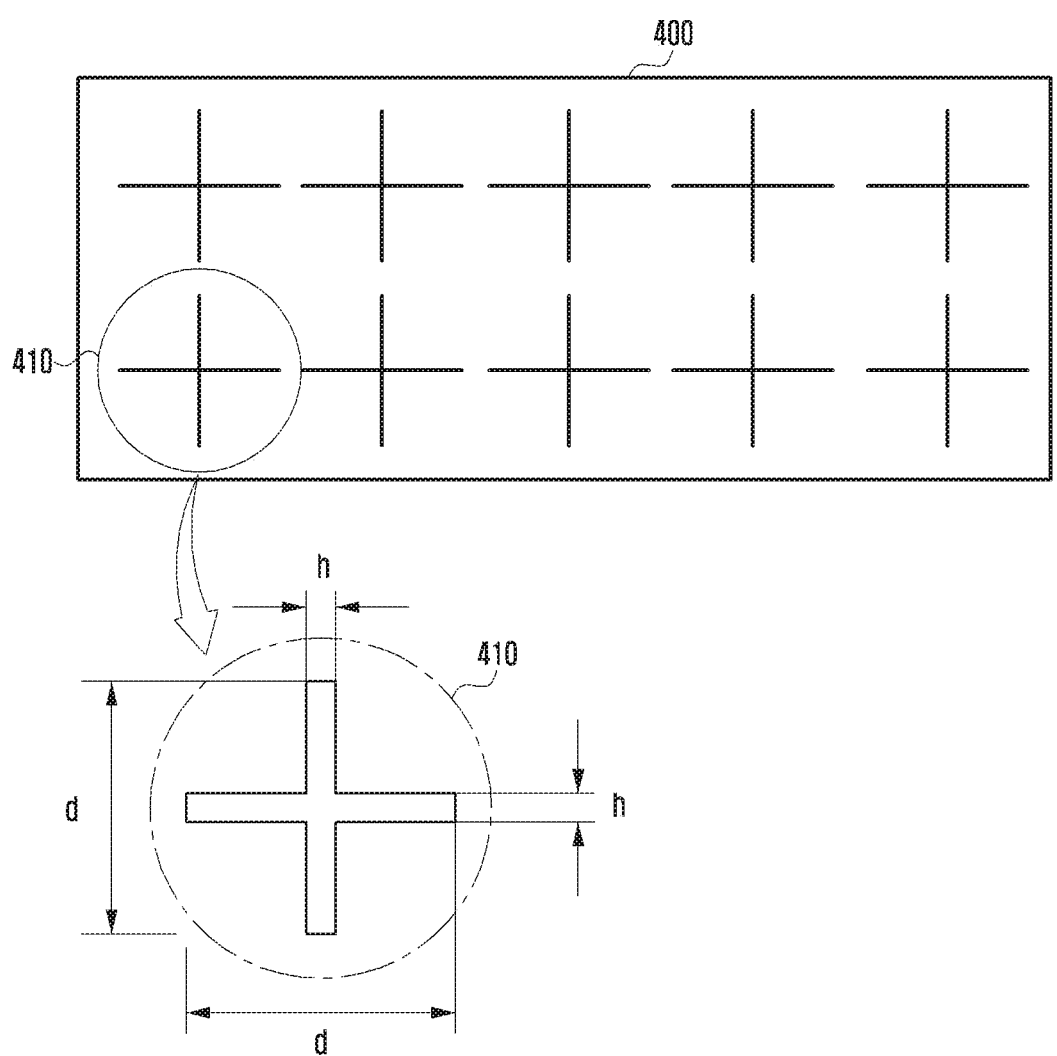
FIG. 4 is a diagram illustrating a shape of a pattern according to an embodiment of the present disclosure.

FIG. 4 is a diagram illustrating a shape of a pattern according to an embodiment of the present disclosure.

The above-described pattern itself is a region where the silver plating is not formed. If the pattern occupies a greater area in a patterned silver plating portion (i.e., 320 in FIG. 3), the area occupied by the silver plating itself becomes smaller. Thus, this may destruct the inherent function of the mirror.

Therefore, the pattern should have the proper shape and size to allow the beam radiated from the beamforming antenna to pass (for this, a greater pattern size is advantageous) while maintaining the mirror's inherent function (for this, a smaller pattern size is advantageous).

According to an embodiment of the present disclosure, the shape of the pattern may be determined based on the wavelength of the beamforming antenna.

Referring to FIG. 4, a unit pattern having a rectangular shape is formed in a silver plating 400 coated on the mirror glass. A plurality of unit patterns are spaced apart from each other at predetermined intervals in the horizontal direction and in the vertical direction. Here, each unit pattern satisfies the following Equation 1.

$$d \geq \lambda/4 \text{ and } h \leq 5 \text{ um} \qquad \text{Equation 1}$$

In Equation 1, d corresponds to a length of the unit pattern, $\lambda$ corresponds to a wavelength of the beamforming antenna, and h corresponds to a width of the unit pattern.

In this disclosure, the unit pattern refers to a unit for forming a pattern, and a plurality of the unit patterns are combined to form a specific pattern. In an embodiment of FIG. 4, the unit pattern is a rectangular shape having a length of d and a width of h.

A plurality of unit patterns may be formed in the silver plating 400 of the mirror glass so as to be spaced apart from each other at predetermined intervals in the horizontal direction and in the vertical direction. That is, the pattern may be formed such that the unit patterns are arranged periodically. This is because the pattern of the periodic array is preferable for maintaining the mirror's inherent function.

In FIG. 4, two unit patterns, namely, one unit pattern having a rectangular shape and elongated in the horizontal direction and another unit pattern having a rectangular shape and elongated in the vertical direction, constitute a cruciform unit pattern 410. In addition, a plurality of the cruciform unit pattern 410 are formed periodically in the silver plating 400 of the mirror glass at regular intervals in the horizontal and vertical directions.

Therefore, as shown in FIG. 4, the cruciform unit pattern 410 formed of two rectangular unit patterns each having a width (h) has the same dimension in length (d) in the horizontal and vertical directions.

In Equation 1, the length (d) is set to be equal to or greater than a quarter of a wavelength of the beamforming antenna, so that a beam radiated from the beam forming antenna can pass through the unit pattern in the silver plating 400 of the mirror glass. Additionally, in Equation 1, the width (h) is set to be equal to or smaller than five microns, so that the function of the mirror having the pattern formed thereon can be maintained.

Also, if the pattern is appropriately utilized, radio frequency (RF) functions, i.e., a frequency selective surface (FSS) function and a lens function may be secured.

The FSS function is to filter the frequency. Through this function, only a necessary radio wave among radio waves radiated from the antenna may pass through, and the others may be reflected to reduce noises of the antenna.

The lens refers to a component capable of adjusting a beam radiation angle and a beam energy by varying the phase of a beam radiated from the antenna. Through this, radio waves radiated from the antenna may be efficiently propagated outside through the pattern.

Figure 5:
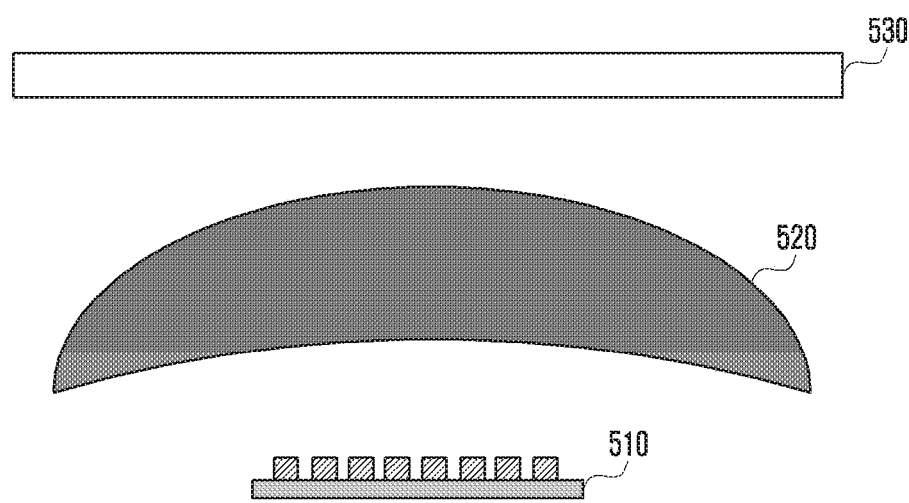
FIGS. 5 and 6 are diagrams illustrating examples of a radome combined with a beamforming antenna according to an embodiment of the present disclosure.
Figure 6:
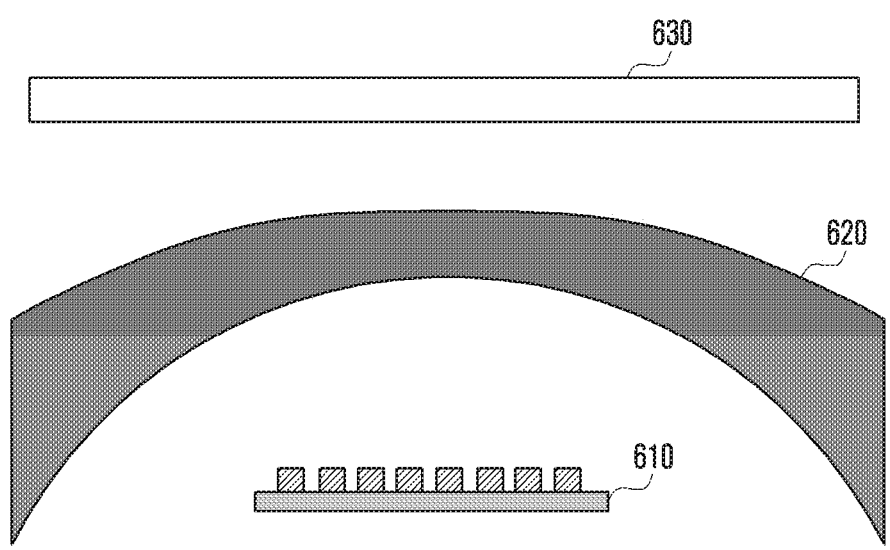

FIGS. 5 and 6 are diagrams illustrating examples of a radome combined with a beamforming antenna according to various embodiments of the present disclosure.

The radome is a cover for protecting the antenna. In order to improve the transmission of radio waves, the material of the radome is preferably formed of an electrical insulator and integrally formed as a whole without any joint. Two type shapes of radome are possible, as follows.

Referring to FIG. 5, one of the shapes of the radome is a convex shaped radome 520 as shown in FIG. 5. This convex shaped radome 520 is equipped between a beamforming antenna 510 and a mirror 530 having a pattern, while covering the beamforming antenna 510.

Referring to FIG. 6, the other of the shapes of the radome is a meniscus lens-shaped radome 620 as shown in FIG. 6. This meniscus lens-shaped radome 620 as well is equipped between a beamforming antenna 610 and a mirror 630 having a pattern, while covering the beamforming antenna 610.

Meanwhile, if the beamforming antenna according to an embodiment of this disclosure can be attached to the mirror without degrading performance as discussed above, consideration may be given to utilizing the beamforming antenna to a vehicle as shown in FIG. 1. Particularly, the beamforming antenna according to the present disclosure may be applied to a side mirror disposed on both sides of the vehicle exterior.

Figure 7:
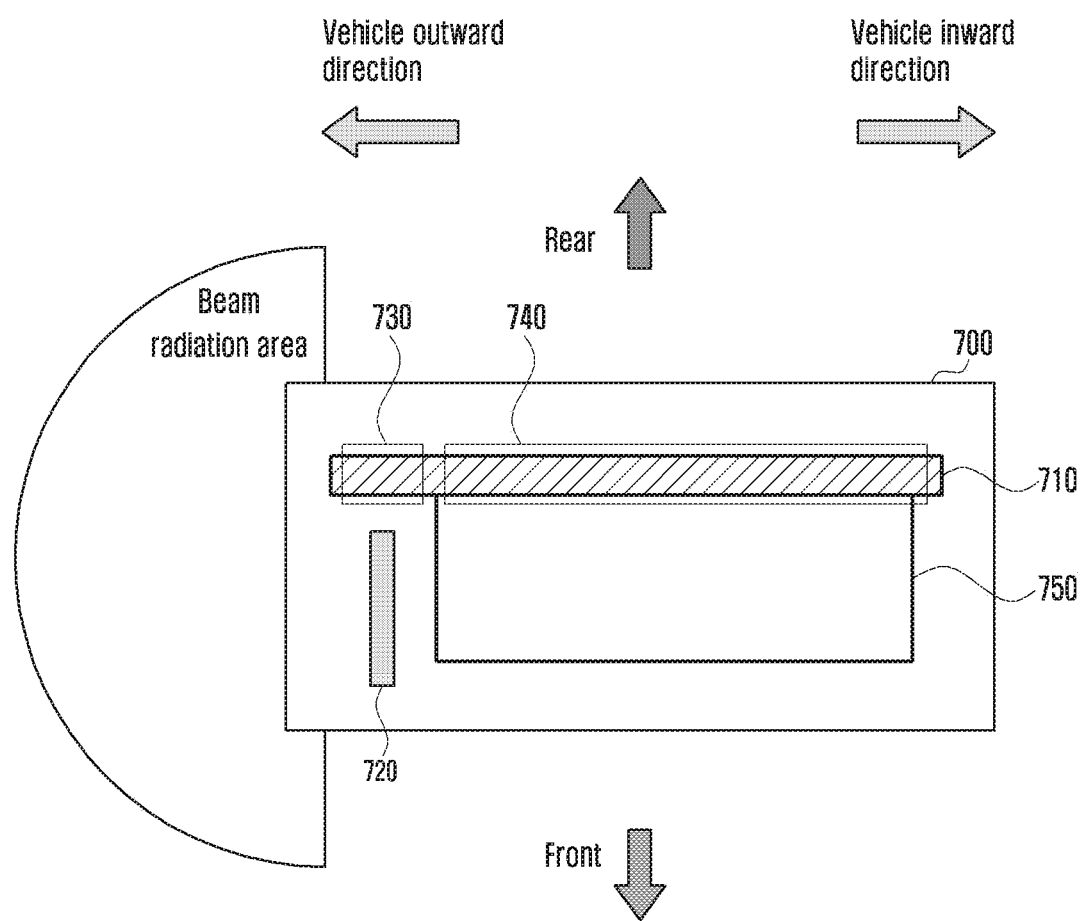
FIG. 7 is a diagram illustrating an example of a beamforming antenna embedded in a vehicle side mirror assembly according to an embodiment of the present disclosure.

FIG. 7 is a diagram illustrating an example of a beamforming antenna embedded in a vehicle side mirror assembly according to an embodiment of the present disclosure.

Referring to FIG. 7, in a vehicle side mirror assembly 700 including a beamforming antenna 720, the beamforming antenna 720 is disposed on a first portion 730 of a mirror glass 710 and embedded in the vehicle side mirror assembly 700. On the first portion 730 of the mirror glass 710, a pattern may be formed to pass a beam radiated from the beamforming antenna 720.

In addition, the vehicle side mirror assembly 700 may further include an electronic device 750 disposed on a second portion 740 of the mirror glass 710 and embedded in the vehicle side mirror assembly 700. On the second portion 740 of the mirror glass 710, a silver plating may be formed.

The electronic device 750 may be an embedded mechanism, such as a motor, for operating the vehicle side mirror assembly 700 and may be formed of metallic materials.

As shown in FIG. 7, the beamforming antenna 720 is disposed at an outer position from the vehicle in the vehicle side mirror assembly 700. A beam radiation area of the beamforming antenna 720 is formed in a semicircular shape from the front to the rear of the vehicle in a vehicle outward direction.

This is because the electronic device 750 may also include a metal. Namely, if the beam radiation area is formed in a vehicle inward direction, a beam radiated from the beamforming antenna 720 may be blocked by the electronic device 750 and thus the performance of the beamforming antenna 720 may deteriorate.

Therefore, it is desirable that the beamforming antenna 720 is disposed at an outer position in the vehicle side mirror assembly 700 so as to form the beam radiation area of the beamforming antenna 720 in a semicircular shape from the front to the rear of the vehicle in a vehicle outward direction.

FIG. 7 schematically shows the right side mirror of the vehicle, and the left side mirror may be formed in the same shape.

Accordingly, it is possible to secure coverage for 5G communication in terms of azimuth described above in FIG. 1. Also, since a housing of the vehicle side mirror assembly 700 is normally made of a plastic material, it is possible to secure coverage for 5G communication in terms of altitude.

The shape of the pattern formed on the first portion 730 of the mirror glass 710 may be determined based on the wavelength of the beamforming antenna 720. In addition, a plurality of unit patterns each of which has a rectangular shape may be spaced apart from each other at predetermined intervals in the horizontal and vertical directions on the mirror glass.

In this case as well, the shape of the unit pattern is required to satisfy the following Equation 2.

$$d \geq \lambda/4 \text{ and } h \leq 5 \text{ um} \quad \text{Equation 2}$$

In Equation 2, d corresponds to a length of the unit pattern, λ corresponds to a wavelength of the beamforming antenna, and h corresponds to a width of the unit pattern.

Further, a radome having a convex shape or a meniscus lens shape may be provided to cover the beamforming antenna 720 shown in FIG. 7, thus protecting the beamforming antenna 720 and also increasing the beam radiation area of the beamforming antenna 720.

Meanwhile, an embodiment of the present disclosure provides a method of utilizing the mirror itself as an antenna by using the above-mentioned pattern.

Figure 8:
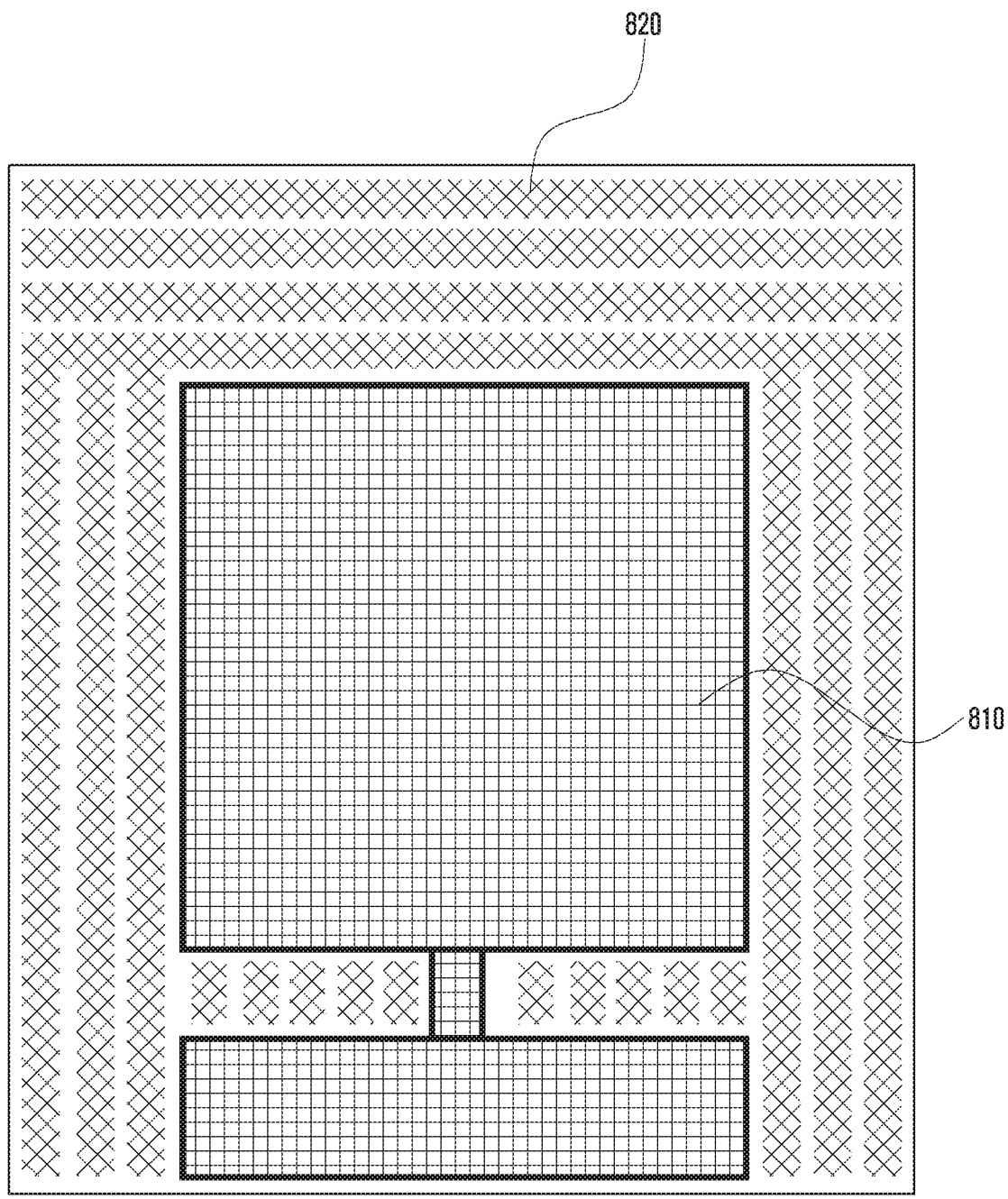
FIG. 8 is a diagram illustrating a pattern of a mirror for an antenna according to an embodiment of the present disclosure.

FIG. 8 is a diagram illustrating a pattern of a mirror for an antenna according to an embodiment of the present disclosure.

Referring to FIG. 8, a mirror for an antenna (hereinafter, referred to as an antenna mirror) may include a first region 810 formed of a plurality of continuous patterns and a second region 820 formed of a plurality of discontinuous patterns.

When an electric current is supplied to the antenna mirror, the current flows through the continuous patterns in the first region 810 to form an electromagnetic wave. On the other hand, in the second region 820, no current flows because of the discontinuous patterns, and thus no electromagnetic wave is formed.

Namely, when the current is supplied to the mirror, the mirror may transmit the radio wave through the first region in which the electromagnetic wave is formed. Therefore, the first region may operate as an antenna while performing the function of the mirror.

The electromagnetic wave formed in the first region may be adjusted by varying the magnitude of the current and/or the interval and shape of the pattern. Therefore, the first region may be utilized not only as a beamforming antenna but also as a regency antenna.

Figure 9A:
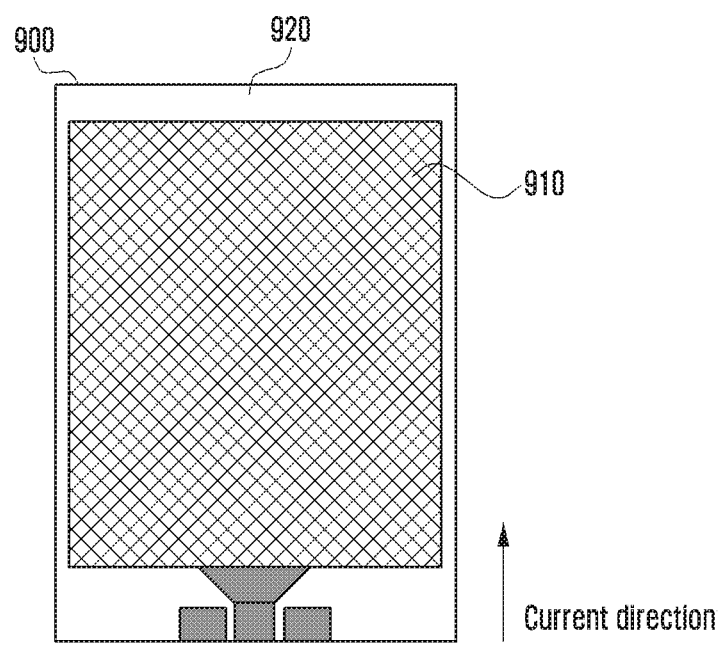
FIG. 9A is a diagram illustrating pattern shapes of a mirror for an antenna according to an embodiment of the present disclosure.
Figure 9A:
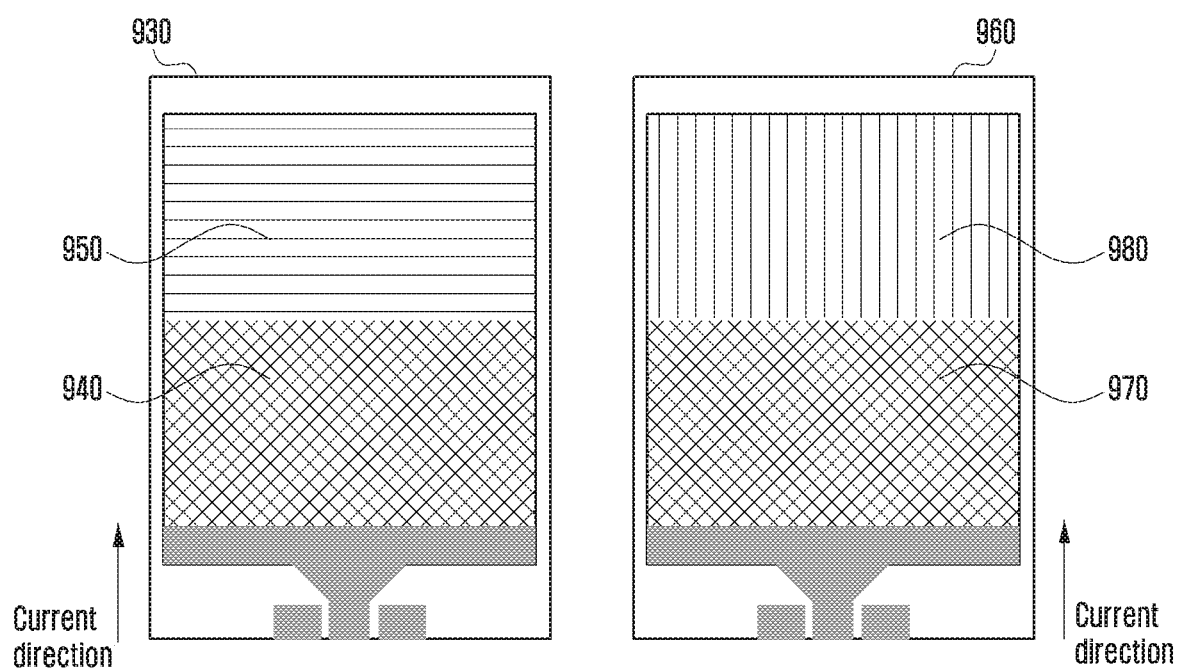

FIG. 9A is a diagram illustrating pattern shapes of a mirror for an antenna according to an embodiment of the present disclosure.

Referring to FIG. 9A, there is shown three types of antenna mirrors. A first antenna mirror 900 includes a first region 910 occupying the majority thereof and a second region 920 formed along the edge thereof. A second antenna mirror 930 includes a first region 940 corresponding to one half thereof and a second region 950 corresponding to the other half. Especially, spaced pattern lines of the second region 950 are perpendicular to a current flow direction. A third antenna mirror 960 includes a first region 970 corresponding to one half thereof and a second region 980 corresponding to the other half. Especially, spaced pattern lines of the second region 980 are parallel with a current flow direction.

Figure 9B:
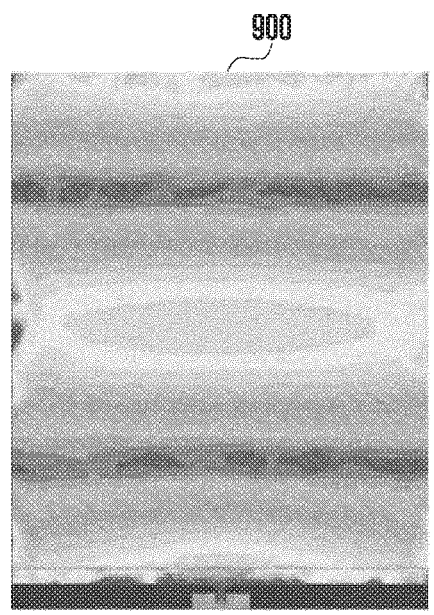
FIG. 9B is a diagram illustrating current distributions of a mirror for an antenna according to an embodiment of the present disclosure.
Figure 9B:
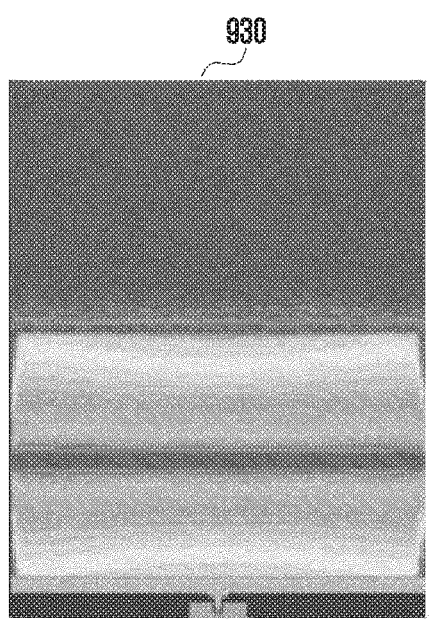
Figure 9B:
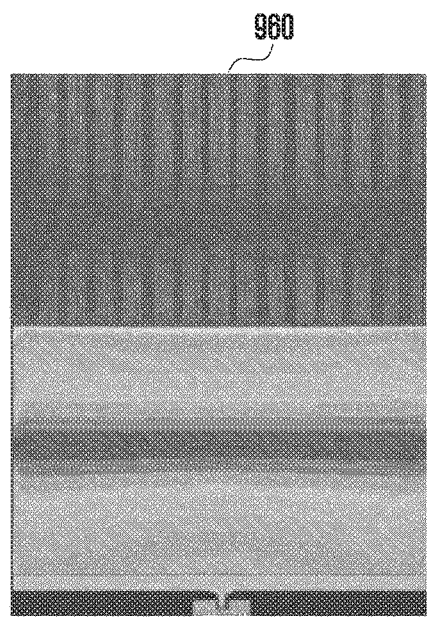

FIG. 9B is a diagram illustrating current distributions of a mirror for an antenna according to an embodiment of the present disclosure.

Referring to FIG. 9B, there is shown the result of analyzing a current distribution of each antenna mirror through simulation when a current is applied to the respective antenna mirrors shown in FIG. 9A.

Since the first antenna mirror 900 is almost composed of the first region, it can be seen from FIG. 9B that the current is uniformly distributed in the entire region of the mirror. On the other hand, since each of the second and third antenna mirrors 930 and 960 has the first region corresponding to the half thereof, it can be seen from FIG. 9B that the current is distributed only in the first region.

In addition, it can be seen from FIG. 9B that the second antenna mirror 930 having spaced pattern lines perpendicular to the current flow direction in the second region is better in current isolation than the third antenna mirror 960 having spaced pattern lines parallel with the current flow direction in the second region. Namely, as shown in FIG. 9B, the second region of the third antenna mirror 960 is brighter in color than the second region of the second antenna mirror 930, and this means that the second antenna mirror 930 has a better isolation property in the second region than the third antenna mirror 960.

Figure 9C:
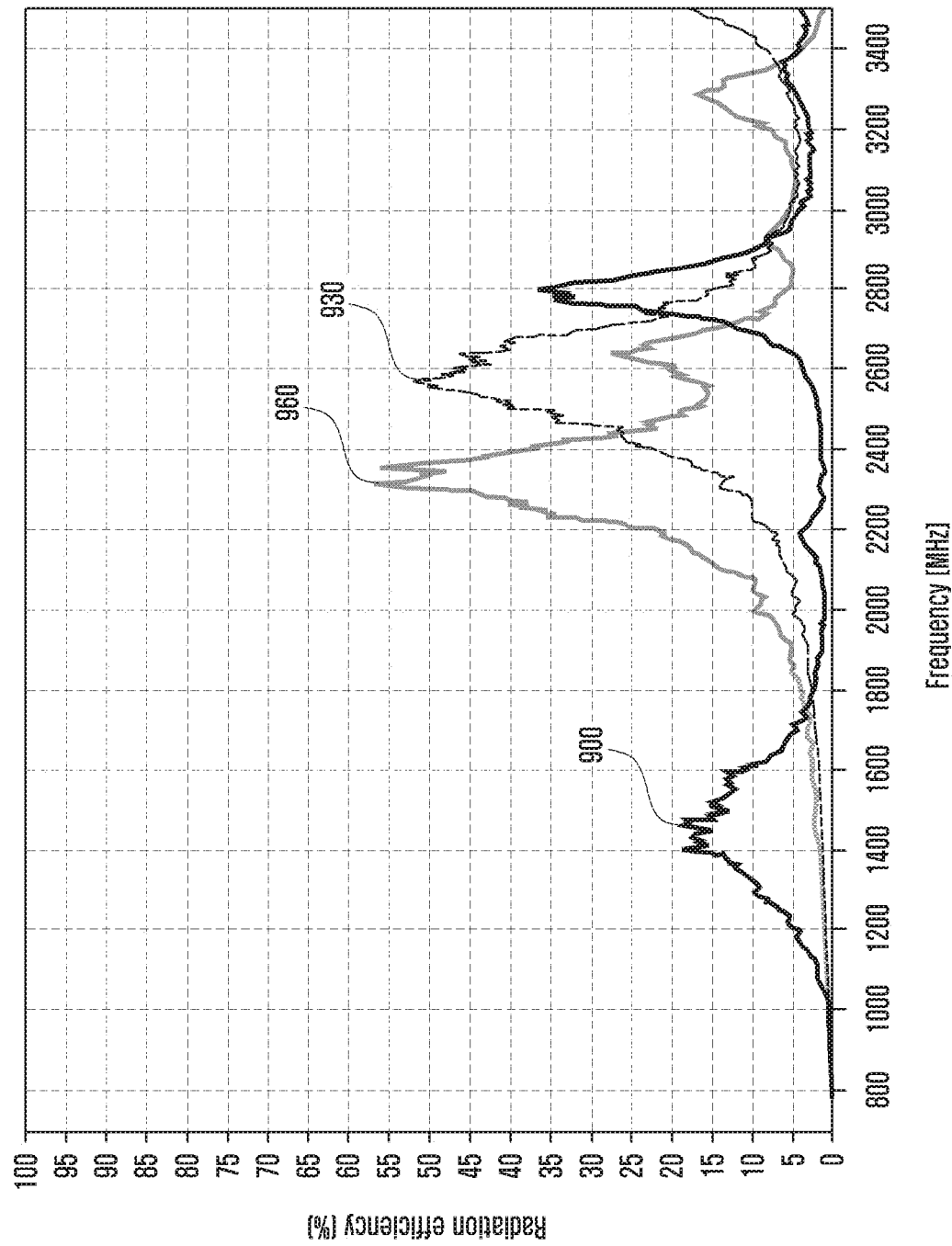
FIG. 9C is a graph showing a relation between frequency and radiation efficiency of a mirror for an antenna according to an embodiment of the present disclosure.

FIG. 9C is a graph showing a relation between frequency and radiation efficiency of a mirror for an antenna according to an embodiment of the present disclosure.

Referring to FIG. 9C, the first antenna mirror 900 has a center frequency of about 1400 MHz, the second antenna mirror 930 has a center frequency of about 2600 MHz, and the third antenna mirror 960 has a center frequency of about 2300 MHz.

This means that it is possible to design antennas having various center frequencies by adjusting the area of the first and second regions. Also, it is possible to design antennas having various center frequencies by changing only the pattern spacing direction in the second region while maintaining the area of the first region equally.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A beamforming antenna assembly comprising:
   a mirror glass coated with a material, the material including a portion and a pattern portion; and
   a beamforming antenna disposed on the pattern portion,
   wherein the beams are radiated from a front surface of the beamforming antenna,
   wherein one side surface of the beamforming antenna is disposed on a rear surface of the pattern portion,
   wherein the front surface of the beamforming antenna is substantially perpendicular to the rear surface of the pattern portion,
   wherein the pattern portion is configured to allow a part of the beams radiated from the front surface of the beamforming antenna to pass through the mirror glass,
   wherein the part of the beams pass through the rear surface of the pattern portion being substantially perpendicular to the front surface of the beamforming antenna,
   wherein the pattern portion includes a plurality of patterns, and
   wherein a length of each of the plurality of patterns is determined based on a wavelength of the beams.

2. The beamforming antenna assembly of claim 1,
   wherein each of the plurality of patterns has a cruciform shape,
   wherein each of the patterns having the cruciform shape is spaced apart from each other at predetermined intervals in a horizontal direction and a vertical direction on the mirror glass,
   wherein the cruciform shape is determined based on a wavelength of the beams,
   wherein a length of the cruciform shape is determined based on a wavelength of the beams, and
   wherein a width of the cruciform shape is 5 μm or less.

3. The beamforming antenna assembly of claim 1,
   wherein the each of the plurality of patterns satisfies an equation:

$$d \geq \lambda/4 \text{ and } h \leq 5 \text{ um}$$

wherein d corresponds to the length of the pattern, $\lambda$ corresponds to the wavelength of the beamforming antenna, and h corresponds to a width of the pattern.

4. The beamforming antenna assembly of claim 1, further comprising:
   a radome formed to cover the beamforming antenna.

5. The beamforming antenna assembly of claim 4,
   wherein the radome is formed of an electrical insulator and integrally formed as a whole without any joints, and
   wherein the radome comprises one of a convex shape or a meniscus lens shape.

6. The beamforming antenna assembly of claim 1, wherein the portion is larger than the pattern portion.

7. The beamforming antenna assembly of claim 6, wherein the beamforming antenna is disposed on the pattern portion adjacent to the portion of the material.

* * * * *